United States Patent [19]
Gouenard et al.

[11] Patent Number: 5,923,283
[45] Date of Patent: Jul. 13, 1999

[54] ALTIMETRIC TYPE MEASUREMENT METHOD FOR USE ON A SATELLITE

[75] Inventors: Sophie Gouenard, Toulouse; Laurent Rey, l'Union, both of France

[73] Assignee: Alcatel Espace, Nanterre Cedex, France

[21] Appl. No.: 08/804,378

[22] Filed: Feb. 21, 1997

[30] Foreign Application Priority Data

Feb. 23, 1996 [FR] France .................................. 96 02252

[51] Int. Cl.⁶ ..................................................... G01S 13/26
[52] U.S. Cl. .......................... 342/120; 342/121; 342/122; 342/123; 342/128; 342/192; 342/196
[58] Field of Search ..................................... 342/120, 121, 342/122, 123, 128, 129, 192, 196, 135

[56] References Cited

U.S. PATENT DOCUMENTS

| | | | |
|---|---|---|---|
| 3,761,946 | 9/1973 | Johannessen et al. | 342/101 |
| 3,838,424 | 9/1974 | Goldfischer | 342/105 |
| 4,157,544 | 6/1979 | Nichols | 342/34 |
| 4,714,928 | 12/1987 | Schmitt | 342/174 |
| 4,733,239 | 3/1988 | Schmitt | 342/94 |

FOREIGN PATENT DOCUMENTS

| | | |
|---|---|---|
| 2712095A1 | 5/1995 | France . |
| WO9505613 | 2/1995 | WIPO . |

OTHER PUBLICATIONS

S. Willsky et al, "Multiresolution optimal interpolation and statistcal analysis of Topex/Poseidon satellitte altimetry", IEEE Transactions on Geoscience and Remote Sensing, vol. 33, No. 2, Mar., 1995, New York, NY pp. 280–292.

Gary S. Brown, "The average impulse response of a rough surface and its applications", IEEE Transactions on Antennas and Propagation, vol. ap25, No. 1, Jan. 1977, New York, NY, pp. 67–74.

*Primary Examiner*—John B. Sotomayor
*Attorney, Agent, or Firm*—Sughrue, Mion, Zinn, Macpeak & Seas PLLC

[57] ABSTRACT

An altimetric type measurement method for use on a satellite transmits a pulse towards the surface of the sea and carries out frequency transformation on the return signal resulting from the reflection of this pulse at the surface of the sea. This produces a spectral signal of samples successively comprising:

(a)—a first zone with a low amplitude level,
(b)—a second zone with a sharply increasing slope ending at a peak, and
(c)—a third zone of decreasing slope.

Samples of the spectral signal are selected within a selection zone that corresponds to the first and second zones for a predetermined maximal level of the height of the waves at the surface of the sea and maximum likelihood processing is applied only to the selected samples.

8 Claims, 4 Drawing Sheets

ALTIMETRIC TYPE MEASUREMENT METHOD FOR USE ON A SATELLITE

BACKGROUND OF THE INVENTION

1. Field of the Invention

The present invention concerns a method of measuring altimetric parameters and a device for implementing the method. The method and the device are typically intended to be used on a satellite.

2. Description of the Prior Art

As shown in FIG. 1, a prior art device for implementing a measuring method of this kind transmits a signal SE vertically which is reflected by the sea M or the ice as a reflected echo SR. By appropriately processing this reflected echo signal SR it is possible to calculate parameters such as the altitude of the satellite, the speed of the wind over the surface of the sea, the height of the waves, etc. In addition to the precise altitude of the satellite, this information offers an assessment of the dynamics of oceans or of the condition of seas.

Referring to FIG. 2, in one embodiment a measuring device of the type for implementing the invention includes a sequencer 10, a ramp signal generator 11, a first amplifier 12, a circulator 100, an antenna 13, a second amplifier 14, a mixer 15, an automatic gain control unit 16, a time-delay unit 16', a demodulator 17, a fast Fourier frequency transform unit 18, a tracking unit 19 and an estimator unit 20.

In a first prior art technique for measuring altitude (to the nearest centimeter), very short pulses are transmitted, having a duration in the order of 0.1 ns, and an altitude is measured as a function of a round trip time for the pulses between the satellite and the ground. Although this technique can be used in the context of the invention, it has two drawbacks. Firstly, it requires a high power transmitter and, secondly, it is characterized by a low signal to noise ratio for the reflected echo signal SR. The use of a long pulse with linear frequency modulation to remedy this is known in itself. To this end, the sequencer 10 produces control pulses I applied to an input of the ramp generator 11. In response, the latter periodically produces long pulses with linear frequency modulation. For example, a pulse I' produced by the generator 11 sweeps a 330 MHz band of frequencies about a center frequency of 900 MHz. After amplification by the amplifier 12 the frequency modulated pulses I' are transmitted by the antenna 13 as the transmitted signal SE.

After reflection from the sea, the transmitted signal SE is received by the antenna 13 as the reflected echo signal SR. This signal SR has characteristics close to those of the transmitted signal SE, although subject to attenuation and to a time-delay equal to the time required for the transmitted signal to make the return trip between the satellite and the Earth.

The pulses Ir forming the reflected echo signal SR are mixed with reference pulses Iref in the mixer 15. The pulses Ir and Iref are both subject to linear frequency modulation and any time-shift between the pulses Ir and Iref is reflected in a frequency value at the output of the mixer 15. Accordingly, a pure frequency is ideally obtained at the output of the mixer 15 for a point target. In reality, and in particular because of the presence of waves V on the surface of the sea M, as will be described below with reference to FIG. 4, the spectrum of the signal obtained at the output of the mixer 15 is spread over a relatively wide band of frequencies. Analysis of this spectrum provides all of the information that the measuring device is required to yield.

The advantage of this so-called "full deramp" mixing technique is that a time difference is converted into a frequency variation. The aim is to eliminate the effects of all transit times in the amplification and processing stages. However, it has the disadvantage of making the measuring device synchronous, as a result of defining an extremely narrow working window, which requires fine tracking using a control loop including the tracking unit 19, as will be described below.

The signal from the mixer 15 is passed through the automatic main control unit 16 to an input of the demodulator 17 which carries out coherent demodulation and the two quadrature output channels of which drive the K-point fast Fourier transform unit 18, where K is an integer that is a power of 2. At the output of the unit 18 there are produced series each of K samples Vi (k) where i is the number of the series and k is the number of a sample within a given series.

As shown in FIG. 3, the successive samples of a given series Vi (k) define a spectrum of particular shape resulting from the reflection of the transmitted signal SE from the sea surface. FIG. 4 shows the modeled representation of this signal, as discussed in the article "The average Impulse Response of a Rough Surface and Its Applications" by Gary S. BROWN published in Transactions on antennas and propagation, vol. AP-25, No 1, January 1977, pages 67–74. The spectral signal represented in analytical form by way of simplification comprises a first zone Z1 where the amplitude is at a low level corresponding to a thermal noise level N, a second zone Z2 with a sharply increasing slope H ending at a peak, and a third zone Z3 with a decreasing slope $\xi$. It can be shown that the slope H of the signal in the second zone Z2 defines the height of the waves on the surface of the sea and that the slope $\xi$ of the signal in the third zone is associated with depointing of the antenna 13 of the measuring device, the level difference $\sigma$ between the level of the spectral signal in the zone Z1 and the peak defines a back-scattering coefficient associated with the wind speed, and the projection of the middle point P of the second zone onto the abscissa axis k is associated with a round trip time $\tau$ between the satellite and the sea.

As previously indicated, the full deramp technique has the drawback of rendering the measuring device synchronous, as the result of defining an extremely narrow working window corresponding to the K points of the fast Fourier transform (FFT). This then requires fine tracking to center the spectral signal obtained in the working window (see FIG. 4). The control loop including the tracking unit 19 fulfills this function. It guarantees that the zone Z2 of the spectral signal with the suddenly increasing slope is positioned at given points of the fast Fourier transform and that the maximal amplitude of the spectral signal is maintained at a given level.

To this end, the tracking unit 19 receives the successive series of K samples Vi (k) and produces first and second control signals Ci and C'i respectively applied to a control input of the automatic gain control unit 16 and to a control input of the time-delay unit 16'. The time-delay unit 16' is adapted to delay each pulse received from the ramp signal generator 11, in accordance with the received control signal C'i, so producing a reference pulse Iref applied to the second input of the mixer the first input of which receives the pulses Ir forming the reflected echo signal SR.

The level of the control signal Ci for iteration i if calculated according to the level of the control signal for iteration (i−1) and an error signal ($\epsilon$Ci) obtained from the series of samples Vi−1 (k). To calculate this error signal ($\epsilon$Ci), the energy is calculated in sliding windows of eight successive samples shifted in steps of 1 sample each time. The energy value measurements are then obtained:

$$E_j = \sum_{j}^{j+8} V_{(i-1)}(j),$$

j varying between 1 and (K–8)

The maximal value Emax from all of these energy values $\{Ej\}$ is then defined. The error signal ($\epsilon$Ci) is then defined by:

($\epsilon$Ci)=10 Log (Emax/8.Vnom)

where Vnom is the required nominal value of the peak level for the spectral signal shown in FIG. 4. In this way the spectral signal is maintained at a given level.

By means of appropriate processing that will be evident to the person skilled in the art, the level of the control signal C'i for iteration i is calculated according to the level of the control signal for iteration (i–1) and an error signal ($\epsilon$C'i) obtained from the series of samples Vi–1 (k). This control signal C'i is produced in order to center the spectral signal shown in FIG. 4 in the window formed by the k points of the fast Fourier transform, in particular so that the middle point of the zone Z2 with suddenly increasing slope is at all times positioned on the same point k1 of the fast Fourier transform.

Because of this tracking, the spectral signal obtained from the fast Fourier transform unit is then at a constant position within the window defined by the points of the FFT. More detailed information on the use of these tracking operations are given in a thesis submitted Sep. 27, 1985 by Jean-Paul DUMONT to the Institut National Polytechnique de Toulouse under the title "Estimation optimale des paramètres altimétriques des signaux radar POSEIDON" ("Optimal estimation of altimetric parameters of POSEIDON radar signals").

Maintaining the spectral signal within a window offers the possibility of processing said signal to measure information characterizing the surface of the Earth to be studied.

This information characterizing the surface of the Earth is obtained using the estimator unit 20 which is typically in the form of processor means implementing the so-called Maximum Likelihood Estimator (MLE) algorithm.

In the prior art, the values of:

(a)—the slope H of the signal in the second zone Z2 defines the height of the waves at the surface of the sea, (b)—the level difference $\sigma$ between the level of the spectral signal in the zone Z1 and the peak level defining the back-scattering coefficient associated with the wind speed, and (c)—the projection of the middle point of the second zone onto the abscissa axis k, associated with a round trip time $\tau$ between the satellite and the sea, are calculated using the MLE algorithm applied to all of the curve defined by the samples of a series Vi (k) (FIG. 4).

To this end, in a manner that is conventional in MLE analysis, the curve of the spectral signal from FIG. 4 is approximated by a model. In the present context, the model is the Brown model which specifies that the spectral signal is the result of the convolution of three terms, namely:

(1)—the response of the sea to a Dirac pulse, (2)—the response of the measuring device for a point target, and (3)—the distribution of the height of the null slope points of the surface.

For more information on this model, reference may usefully be had to the article previously mentioned "The average Impulse Response of a Rough Surface and Its Applications" by Gary S. BROWN published in Transactions on antennas and propagation, vol. AP-25, No 1, January 1977, pages 67–74.

In the Brown model, the curve is modeled in the following manner, where V (t) is the time equivalent of the spectral component Vi (k):

$V(t)=\sigma/2.\{1+\text{erf}[(t-\tau)/(\sqrt{2}.\sigma_c)]\}$, for $t \leq \sigma$; and $V(t)=\sigma/2.\{1+\text{erf}[(t-\tau)/(\sqrt{2}.\sigma_c)]\}.\exp[-\alpha(t-\tau)]$, for $t \geq \sigma$ where $\sigma$ and $\tau$ are the parameters introduced in discussing FIG. 4, $\sigma_c=\sqrt{[0.513.T+(H/2c)]}$ where T is the duration of the frequency modulated pulses, H is the wave height parameter and c is the speed of light, and $\alpha=(4.c/\psi.H)$, $\psi$ being equal to $0.725.\sin^2(\theta)$ and $\theta$ being the aperture angle of the antenna 13 of the measuring device.

By defining a model of this kind and using an MLE algorithm that is well known to the person skilled in the art, the prior art approximates the respective values assumed by the parameters H, $\sigma$ and $\tau$ for the curve of the spectral signal Vi (k) concerned for values of k between 1 and K. This MLE analysis is applied to all of the samples of a series Vi (k), possibly previously averaged to reduce speckle. This solution has the main disadvantage of leading to the following compromise.

Either the number of samples in the zone Z3 is reduced to a minimal number so that the calculated values assumed by the parameters H, $\sigma$ and $\tau$ are not skewed (a result of this is a somewhat imprecise measurement of the value of the slope parameter $\xi$) or the number of samples in the zone Z3 is increased to a higher number to obtain a more precise measurement of this value of the slope parameter $\xi$. This skews the measurement of the values assumed by the parameters H, $\sigma$ and $\tau$ in the event of depointing the antenna and the prior art in the form of the thesis submitted Sept. 27, 1985 by Jean-Paul DUMONT to the Institut National Polytechnique de Toulouse under the title "Estimation optimale des paramètres altimétriques des signaux radar POSEIDON" ("Optimal estimation of altimetric parameters of POSEIDON radar signal"), pp. 215–216, suggests a posteriori correction of the measurement of the values assumed by the parameters H, $\sigma$ and $\tau$ according to the value assumed by the parameter $\xi$, which is calculated separately. This correction nevertheless results in imprecise calculations of the value of these parameters.

The invention is aimed at overcoming this disadvantage, notably by providing a measuring device adapted to provide precise measurements of the values assumed by all of the parameters H, $\sigma$, $\tau$ and $\xi$.

SUMMARY OF THE INVENTION

To this end, an altimetric type measurement method for use on a satellite and comprising the steps of:

transmitting measurement pulses towards the surface of the sea, frequency transformation of a resultant signal resulting from the reflection of said pulses at the surface of the sea into a spectral signal of samples successively comprising:

(a)—a first zone with a low amplitude level corresponding to a thermal noise level, (b)—a second zone with a sharply increasing slope ending at a peak and dependent on the height of the waves at the surface of the sea, a back-scattering coefficient and the altitude of said satellite, and (c)—a third zone of decreasing slope associated with depointing of an antenna of the measuring device, and estimating from said samples of said spectral signal, by means of maximum likelihood processing using a model ignoring depointing of the antenna, at least one of the following values: the height of the waves at the surface of the sea, the back-scattering coefficient and the altitude of the satellite, in which method samples of said spectral signal are selected within a selection zone that corresponds to said first and second zones for a predetermined maximal level of the height of the waves at the surface of the sea, said maximum likelihood processing being applied only to the selected samples.

The measuring pulses are advantageously frequency modulated and the frequency transformation step is advantageously preceded by a step of mixing a frequency modulated reference pulse with each of said frequency modulated measurement pulses received after reflection from said sea surface to produce said resultant signal.

The method typically further comprises selection of those samples of said spectral signal that are within a third selection zone that corresponds to said third zone for a predetermined maximal level of the height of the waves on the surface of the sea and measurement of the depointing of the antenna according to the decreasing slope of said spectral signal in said third selection zone.

There is additionally provision for selecting those of the samples of said spectral signal that are within a first selection zone that corresponds to said first zone for a predetermined maximal level of the height of the waves on the surface of the sea and measurement of the thermal noise level as a function of the mean level of said selected samples of said first selection zone.

A method of this kind uses tracking of the spectral signal of samples in order to center it in the frequency window of said frequency transform.

The invention further provides an altimeter type measuring device for use on a satellite, including:

means for transmitting measurement pulses towards the surface of the sea, means for frequency transformation of a resultant signal resulting from the reflection of said pulses at the surface of the sea to produce a spectral signal of samples successively comprising:

(a)—a low amplitude level first zone corresponding to a thermal noise level, (b)—a second zone with a sharply increasing slope ending at a peak and dependent on the height of the waves at the surface of the sea, a back-scattering coefficient and the altitude of said satellite, and (c)—a decreasing slope third zone associated with depointing of an antenna of said measuring device and, means for estimating from said samples of said spectral signal, by means of maximum likelihood processing using a model ignoring depointing of said antenna, at least one of the following values: the height of the waves at the surface of the sea, the back-skattering coefficient and the altitude of the satellite, the device further including means for selecting samples of said spectral signal in a selection zone that corresponds to said first and second zones for a predetermined maximal level of the height of the waves at the surface of the sea and said maximum likelihood processing being applied only to these selected samples.

Other features and advantages of the present invention will emerge more clearly from a reading of the following description given with reference to the corresponding accompanying drawings.

DETAILED DESCRIPTION OF THE PREFERRED EMBODIMENT

Figure 1:
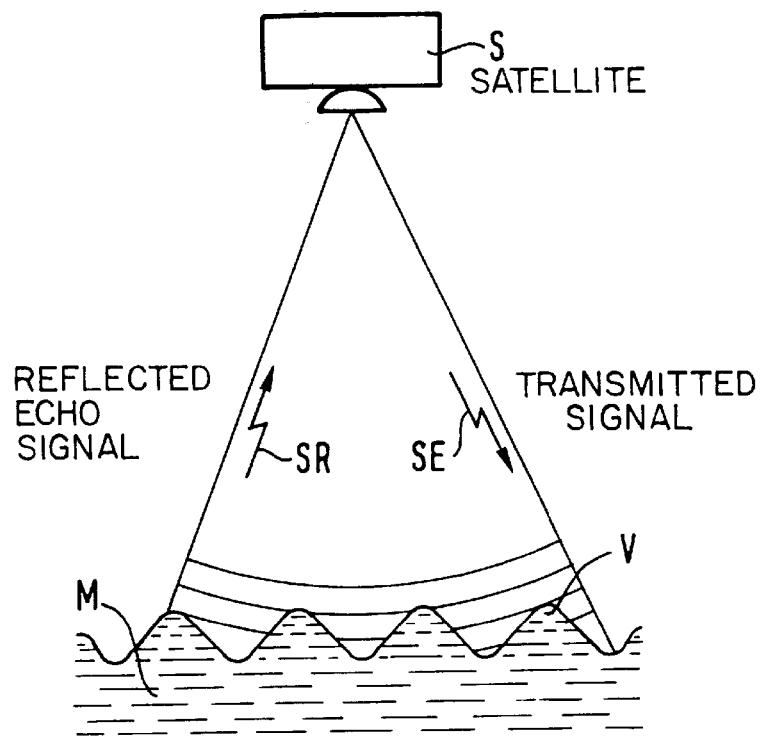
FIG. 1, already commented on, shows in schematic form a preferred embodiment of a measuring device on board a satellite transmitting measuring pulses towards the surface of the sea.
Figure 3:
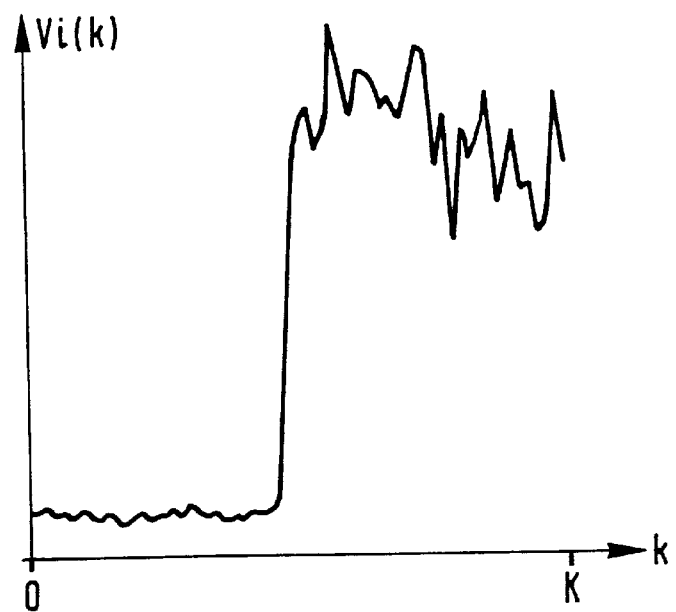
FIG. 3 shows a spectral signal characterizing the surface of the sea that is obtained by the means of the FIG. 2 device.
Figure 2:
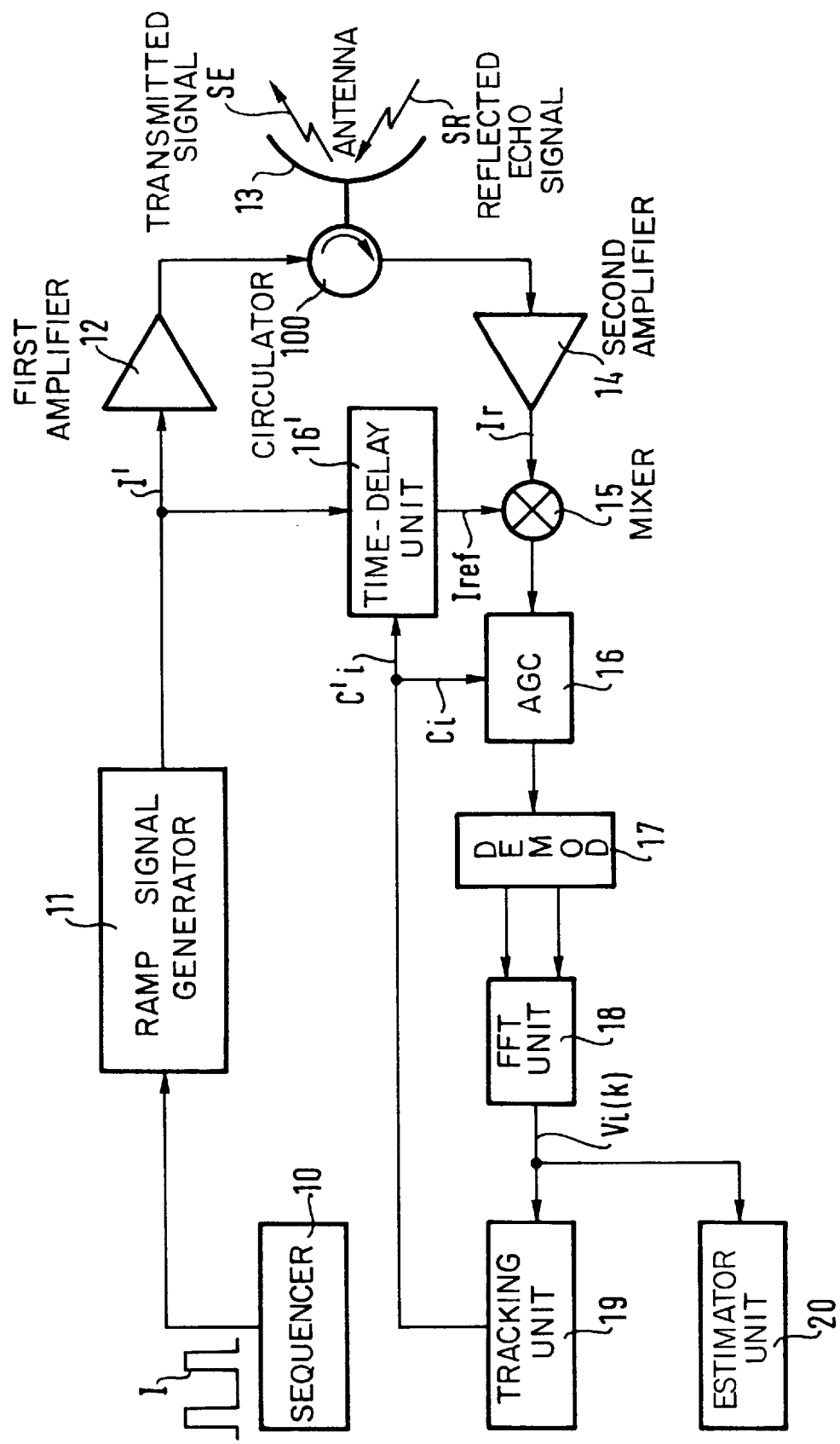
FIG. 2, also already commented on, shows a block diagram of a prior art measuring device.
Figure 4:
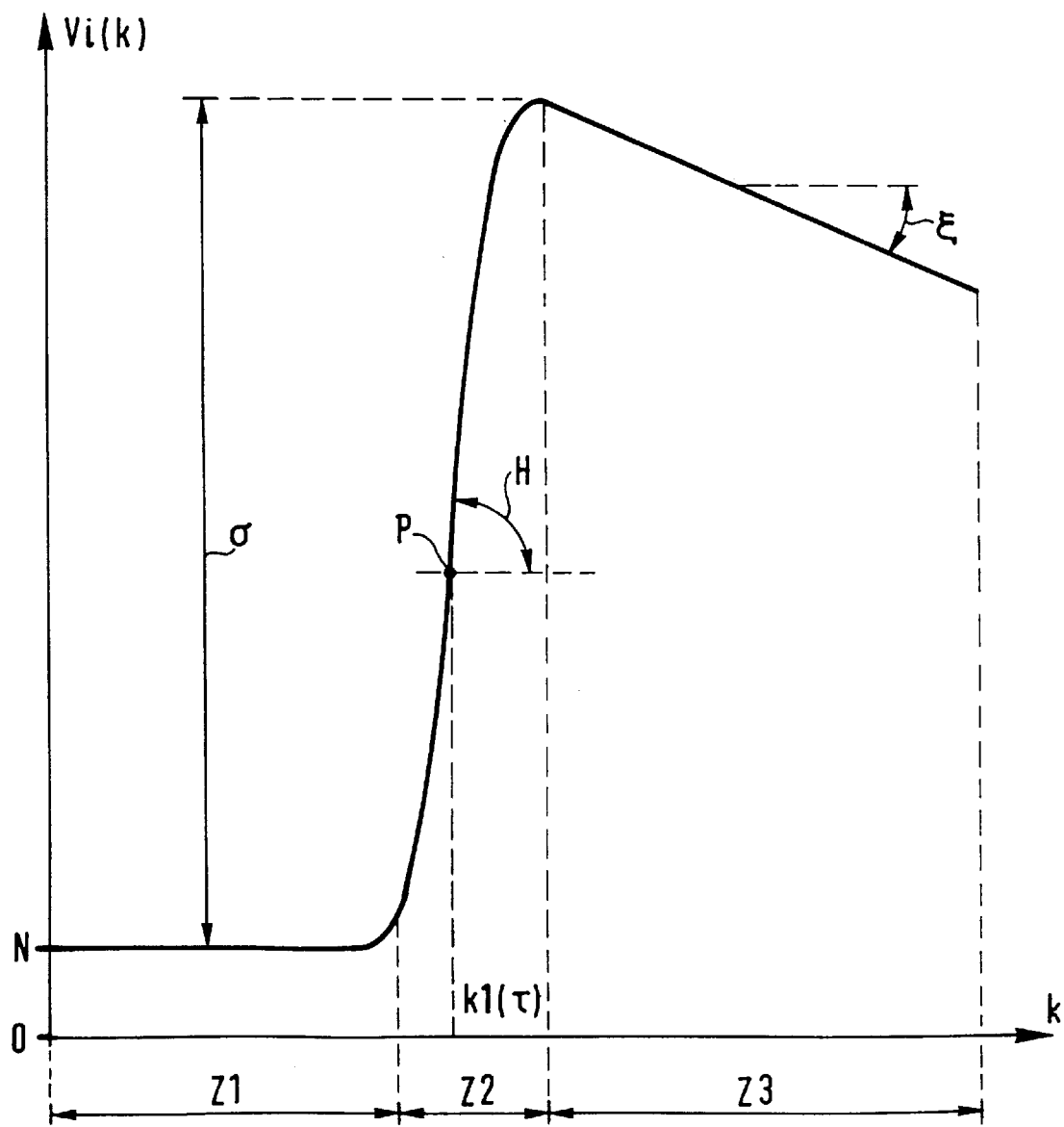
FIG. 4 shows in more detail the parameters associated with the FIG. 2 spectral signal.

Referring to FIGS. 2 and 4, and as referred to in the preamble of the description, the tracking unit 19 guarantees that the spectral signal Vi (k) in the form shown in FIG. 4 is maintained within a window of K samples. In particular, it guarantees that the middle point of the zone Z2 of the spectral signal with sharply increasing slope is located at a given point k1 of the fast Fourier transform FFT. It will be remembered that the spectral signal Vi (k) comprises in succession a first zone Z1 with a low amplitude level corresponding to a thermal noise level N, a second zone Z2 with a suddenly increasing slope H ending at a peak, and a third zone Z3 with a decreasing slope $\xi$.

Figure 5:
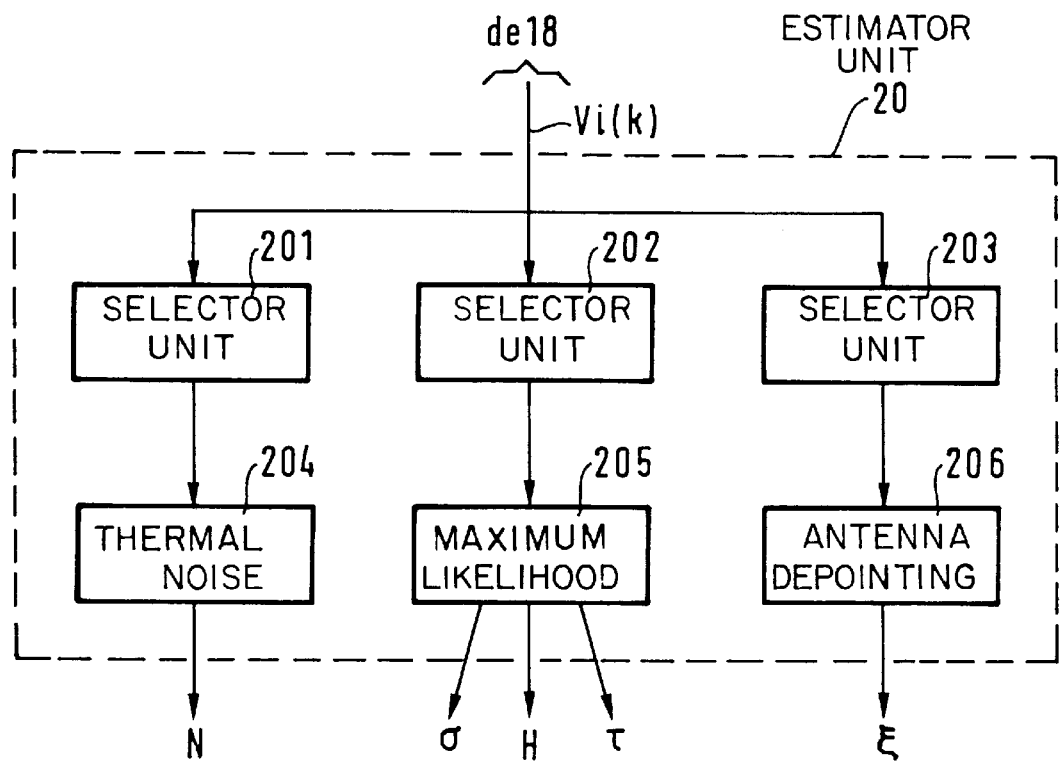
FIG. 5 is a detailed block diagram of an estimator unit in accordance with the invention included in the measuring device from FIG. 1.

As shown in FIG. 5, the estimator unit of the invention comprises three selector units 201, 202 and 203 for respectively selecting those of the samples of the spectral signal of a first selection zone S1, those of the samples of the spectral signal of this first selection zone S1 and a second selection zone S2, and finally those of the samples of the spectral signal of a third selection zone S3. The outputs of these three selector units are respectively applied to a thermal noise measurement unit 204, a maximum likelihood processor unit 205 and a unit 206 for measuring depointing of the antenna 13.

In the embodiment described, the fast Fourier transform, or frequency transform, unit 18 operates on K=128 points. The tracking unit 19 guarantees that the middle point P of the samples of zone Z2 (FIG. 4) is maintained at a given abscissa k1, as described in the thesis already referred to.

The maximum likelihood processor unit 205 operates on the following principle:

The MLE estimation equation is written:

$$\sum_{k=1}^{K} \frac{Vk - V°k}{(V°k)^2} \frac{\partial V°k}{\partial \theta m} = 0;$$

m=1 through M
where $\{Vk\}_{k=1,K}$ represents the K samples of a signal to be processed, $\{V°k\}_{k=1,K}$ represents the K samples of a modeled signal associated with this signal to be processed, and $\{\theta m\}_{m=1,M}$ represents the M parameters of the signal to be processed that are to be estimated.

Its iterative solution is given by:

$$\theta(n+1) = \theta(n) - \beta(B.B^T)B.D, \ m=1 \text{ through } M$$

β being a constant with a typical value between 0.5 and 0.8,

B and D being matrices irrespectively defined by the matrix elements:

$$Bmk = 1/V°k \cdot \partial V°k/\partial\theta m, \text{ and}$$

$$D1k = (V°k - Vk)V° k$$

In our case, the M parameters $(\theta m)_{m=1,M}$ are defined by H, σ and τ and the samples V°k are obtained by means of the model already referred to, namely the model:

$$V(t) = \sigma/2 \cdot \{1 + \text{erf}[(t-\tau)/(\sqrt{2}.\sigma_c)]\}, \text{ for } t \leq \sigma; \text{ and}$$

$$V(t) = \sigma/2 \cdot \{1 + \text{erf}[(t-\tau)/(\sqrt{2}.\sigma_c)]\} \cdot \exp[-\alpha(t-\tau)], \text{ for } t \geq \sigma$$

where σ and τ are the parameters introduced with reference to FIG. 4, $$\sigma_c = \sqrt{[0.513.T + (H/2c)]},$$

where T denotes the duration of the frequency modulated pulses, H the wave height parameter, c the speed of light, and $$\alpha = (4.c/\psi.H),$$

ψ being equal to $0.725.\sin^2(\theta)$ and θ being the aperture angle of the antenna 13 of the measuring device.

The model V (t), or V°k, is defined on the basis of the Brown model (convolution of three terms, namely:

(1)—the response of the sea to a Dirac pulse,
(2)—the response of the measuring device for a point target, and
(3)—the distribution of the heights of the null slope points of the surface), ignoring the depointing ε of the antenna.

Figure 6:
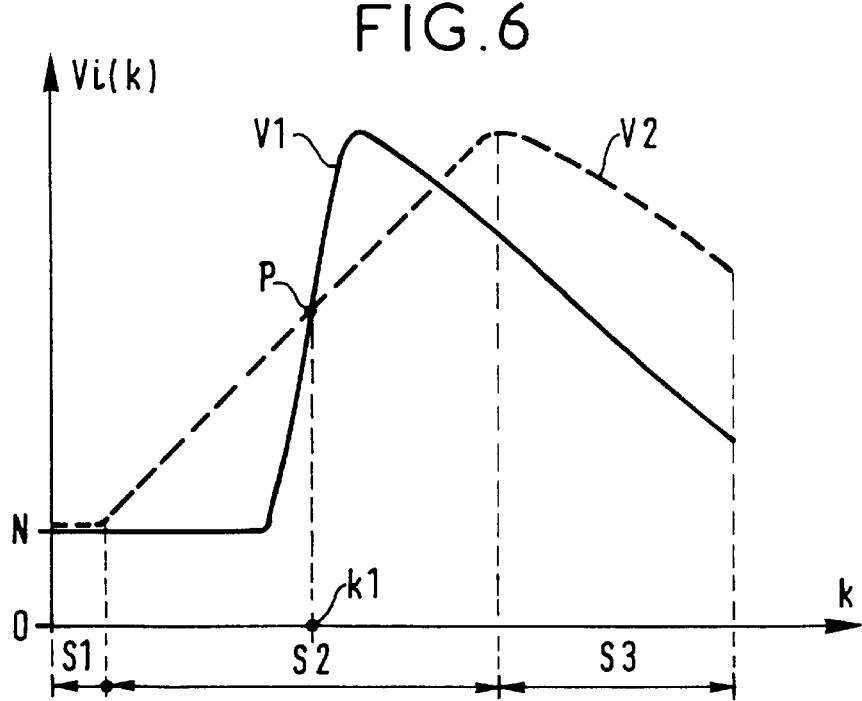
FIG. 6 shows two spectral signals respectively obtained for minimal and maximal levels of the height of the waves on the surface of the sea, in order to explain how the invention is put into effect.

As shown in FIG. 6, the zone Z2 of sharply increasing slope (FIG. 4) of the spectral signal Vi (k) is spread over a greater or lesser number of samples k according to the height of the waves at the surface of the sea, i.e. the slope H of this zone. Furthermore, the tracking unit 19 maintains the abscissa of the middle point P at a given sample k1 regardless of the slope of the spectral signal Vi (k) in zone Z2.

The maximal spreading of the spectral signal Vi (k) in the zone Z2 is obtained for a maximal value of the height of the waves on the sea, which corresponds to the curve V2 in FIG. 6. For its part, the curve V1 corresponds to minimal spreading of the spectral signal in the zone Z2.

It is on the basis of this curve V2 that the selection zones S1, S1+S2 and S3, in which the samples are selected by the respective units 201, 202 and 203, are defined.

Thus the unit 201 selects the first few samples of the spectral signal Vi (k) that belong to the zone Z1 for a maximal spreading of the spectral signal Vi (k) in the zone Z2 when the height of the waves on the sea assumes a maximal value. The thermal noise measurement unit 204 then measures a mean value of these samples selected by the unit 201. The zone S1 is preferably defined by a minimal number of samples so that the majority of the samples of the spectral signal belong to the other two selection zones S2 and S3.

The unit 202 selects the samples of the spectral signal Vi (k) within a selection zone (S1+S2) that is defined by the first and second zones Z1 and Z2 for a predetermined maximal level of the height of the waves on the surface of the sea. It will be remembered that the low amplitude level first zone Z1 corresponds to a thermal noise level N and that the second zone Z2 with a sharply increasing slope H ends at a peak. The maximum likelihood processing carried out by the unit 205 in the manner previously defined then applies only to the samples selected from the zone (S1+S2).

Similarly, the unit 203 selects the samples of the spectral signal Vi (k) in a third selection zone S3 which corresponds to the third zone Z3 (FIG. 4) for a predetermined maximal level of the height of the waves at the surface of the sea. The unit 206 then measures the depointing of the antenna as a function of the decreasing slope ε of said spectral signal in this third selection zone, on the basis of the samples selected from the zone S3.

Thus the invention does not make provision for any a posteriori correction of the skew induced into the measurement of the values assumed by the parameters H, σ and τ as a function of the value assumed by the parameter ε which is calculated separately, but limits the measurement of the values assumed by the parameters H, σ and τ to only pertinent samples of the spectral signal Vi (k), that is to say the samples from the zone (S1+S2), in order to limit the impact of the depointing ε on said parameters.

Although the invention has been described in a preferred embodiment using the full deramp technique, any other technique may be used to obtain the samples Vi (k), such as techniques transmitting short pulses or using code pulse compression. Any technique using:

(a)—transmission of measurement pulses to the surface of the sea, and
(b)—a frequency transform of a signal resulting from the reflection of those pulses from the surface of the sea, into a spectral signal of samples, can therefore be used to implement the invention.

Moreover, to limit the effect of unwanted noise in the spectral signals of samples Vi (k), provision may be made for excluding from the estimation processing certain samples, typically the extreme lefthand lateral samples, for example Vi (1) through Vi (5), and the extreme righthand lateral samples, for example Vi(K−5) through Vi (K).

There is claimed:

1. An altimetric type measurement method for use on a satellite and comprising the steps of:

transmitting measurement pulses towards the surface of the sea, frequency transformation of a resultant signal resulting from the reflection of said pulses at the surface of the sea into a spectral signal of samples successively comprising:

(a)—a first zone with a low amplitude level corresponding to a thermal noise level,
(b)—a second zone with a sharply increasing slope ending at a peak and dependent on the height of the waves at the surface of the sea, a back-scattering coefficient and the altitude of said satellite, and
(c)—a third zone of decreasing slope associated with depointing of an antenna of the measuring device, and estimating from said samples of said spectral signal, by means of maximum likelihood processing using a model ignoring depointing of the antenna, at least one of the following values: the height of the waves at the surface of the sea, the back-scattering coefficient and the altitude of the satellite, in which method samples of said spectral signal are selected within a selection zone that corresponds to said first and second zones for a predetermined maximal level of the height of the waves at the surface of the sea1 said maximum likelihood processing being applied only to the selected samples.

2. The method claimed in claim 1 wherein said measurement pulses are frequency modulated and said frequency transformation step is preceded by a step of mixing a frequency modulated reference pulse with each of said frequency modulated measurement pulses received after reflection at said surface of the sea to produce said resultant signal.

3. The method claimed in claim 1 including selection of samples of said spectral signal in a this selection zone that corresponds to said third zone for predetermined maximal level of the height of the waves at the surface of the sea and measuring depointing of said antenna as a function of the decreasing slope of said spectral signal in said third selection zone.

4. The method claimed in claim 1 wherein samples of said spectral signal are selected in a first selected zone that corresponds to said first zone for predetermined maximal level of the height of the waves a the surface of the sea and said thermal noise level is measured as a function of the mean level of said selected samples from said first selection zone.

5. The method claimed in claim 1 wherein said spectral signal of samples is tracked so as to center it in the frequency window of said frequency transform.

6. The method claimed in claim 5 wherein said tracking is effected so that the number of samples of said spectral signal in said first selection zone is minimal.

7. An altimeter type measuring device for use on a satellite, including:
means for transmitting measurement pulses towards the surface of the sea,
means for frequency transformation of a resultant signal resulting from the reflection of said pulses at surface of the sea to produce a spectral signal of samples successively comprising:
(a) a low amplitude level first zone corresponding to a thermal noise level,
(b) a second zone with a sharply increasing slope ending at a peak and dependent on the height of the waves at the surface of the sea, a back-scattering coefficient and the altitude of said satellite, and
(c) a decreasing slope third zone associated with depointing of an antenna of said measuring device and,
means for estimating from said samples of said spectral signal, by means of maximum likelihood processing using a model ignoring depointing of said antenna, at least one of the following values: the height of the waves at the surface of the sea, the back-scattering coefficient and the altitude of the satellite, the device further including means for selecting samples of said spectral signal in a selection zone that corresponds to said first and second zones for a predetermined maximal level of the height of the waves at the surface of the sea and said maximum likelihood processing being applied only to these selected samples.

8. The device claimed in claim 7 wherein said pulses transmitted are frequency modulated and further including means for mixing a frequency modulated reference pulse with each of said frequency modulated measurement pulses received after reflection at the surface of the sea to produce said resultant signal.

* * * * *